United States Patent
Chiou

(10) Patent No.: US 6,873,583 B2
(45) Date of Patent: Mar. 29, 2005

(54) APPARATUS AND METHOD OF POWER COMPENSATION AND OPTICAL DEVICE USING THE SAME

(75) Inventor: Ching-Ning Chiou, Hsinchu Hsien (TW)

(73) Assignee: MediaTek Inc., Hsinchu (TW)

( * ) Notice: Subject to any disclaimer, the term of this patent is extended or adjusted under 35 U.S.C. 154(b) by 356 days.

(21) Appl. No.: 10/065,515

(22) Filed: Oct. 25, 2002

(65) Prior Publication Data

US 2004/0032806 A1 Feb. 19, 2004

(30) Foreign Application Priority Data

Aug. 19, 2002 (TW) ........................................ 91118640 A

(51) Int. Cl.[7] .............................................. G11B 7/00
(52) U.S. Cl. ................ 369/47.5; 369/53.23; 369/59.11; 369/44.29
(58) Field of Search ............................. 369/47.1, 47.25, 369/47.5, 47.53, 47.55, 53.1, 53.11, 53.23, 53.26, 53.28, 59.11, 116, 44.27, 44.29, 44.35

(56) References Cited

U.S. PATENT DOCUMENTS 5,446,716 A * 8/1995 Eastman et al. ......... 369/47.51
5,675,568 A * 10/1997 Hajjar et al. ............. 369/47.51

* cited by examiner

*Primary Examiner*—Muhammad Edun
(74) *Attorney, Agent, or Firm*—J.C. Patents

(57) ABSTRACT

Apparatus and method of power compensation and optical device using the same. The power compensation apparatus is used to compensate a write power of the optical device. The power compensation apparatus has a signal extraction circuit, a gain setting unit, and an adder. The signal extraction circuit is used to extract a absolute value of a portion of a servo error signal over a threshold voltage. The gain setting unit is used to generate a compensation signal using a gain thereof to adjust the absolute value of the portion of the servo error signal over the threshold voltage. The adder is used to add the compensation signal into the write power.

11 Claims, 1 Drawing Sheet

APPARATUS AND METHOD OF POWER COMPENSATION AND OPTICAL DEVICE USING THE SAME

CROSS REFERENCE TO RELATED APPLICATIONS

This application claims the priority benefit of Taiwan application serial no. 91118640, filed on Aug. 19, 2002.

BACKGROUND OF INVENTION

1. Field of the Invention

The invention relates in general to an apparatus and a method of power compensation and an optical device using the same, and more particularly, to an apparatus and a method of power compensation and an optical device using the same, which compensates a write power according to a servo error signal.

2. Related Art of the Invention

In the commonly known optical device, a laser beam can be used to record or write to a compact disc (CD) for storing required data. Currently, recordable compact disc (CD-recordable or CD-R) and rewritable compact disc (CD-rewritable or CD-RW) have been developed to record/reproduce data using a light beam to write or read the data.

For the data writing process, the write power of the light beam is reduced or unstable due to certain operation factors, such as the dust deposited on the surface of the compact disc or a finger mark remaining thereon. The conventional method for compensating the write power of the light beam includes a running optimum power control (ROPC) using a write radio frequency signal. However, under certain circumstances such as the amplification of the servo error signal caused by poor manufacturing process of the compact disc that reduces the effective write power on the disc of the light beam, running optimum power control cannot obtain compensation in real time.

Particularly after the burning operation for recording the compact disc or when speed multiplication has been increased, that is, the rotating speed of the spindle motor has been enhanced, the unstablility of servo system occurs even more frequently due to the poor manufacturing process of the compact disc. For example, for vertical or radial noise, vertical deviation disc, or the eccentric disc, a real-time compensation cannot be achieved by running optimum power control, so that reading error occurs.

SUMMARY OF INVENTION

The present invention provides a power compensation apparatus to compensate a write power. The power compensation apparatus comprises a signal extraction circuit, a gain setting unit and an adder. The signal extraction circuit is used to extract an absolute value of a portion of an error signal over a threshold voltage of the signal extraction circuit. The gain setting unit generates a compensation signal using a gain to adjust the absolute value of the error signal over the threshold voltage. The adder then adds the compensation signal into the write power. The error signal is the servo error signal caused during operation of the system.

The present invention further provides an optical device that uses a light beam such as a laser beam to perform data recording/reproducing on an optical record carrier such as a compact disc. A light beam is used to write data in or read data from the compact disc for data recording/reproducing. The optical device includes a power compensation apparatus for compensating power of the laser light beam. The power compensation apparatus includes a servo error signal extraction circuit and a gain setting unit. The servo error signal extraction circuit is used to receive a servo error signal and extract an absolute value of a portion of the servo error signal over a threshold voltage of the servo error signal extraction circuit. The servo error signal is an error signal generated by a servo system, for example, a servo error signal output from a radio frequency (RF) amplifier. In one embodiment of the present invention, a focus error signal is used as an example of the servo error signal. The gain setting unit then receives the absolute value of the portion of the servo error signal over the threshold voltage and generates a compensation signal using a gain value to adjust the absolute value of the portion of the servo error signal over the threshold voltage. An adder is then used to add the compensation signal to the laser light beam, so as to compensate the write power thereof.

In the above power compensation apparatus or the optical device including the power compensation apparatus, the servo error signal includes a focus error signal or a tracking error signal.

The present invention further provides a power compensation method to compensate a write power. A servo error signal is received, and an absolute value of a portion of the servo error signal over a threshold voltage is extracted. According to a gain value, the absolute value is adjusted to generate a compensation signal. The compensation signal is then added to the write power.

The present invention also provides an optical device suitable for use as a light beam for recording/reproducing data in a recording carrier. The optical device comprises a power compensation apparatus and a gain setting unit. The power compensation circuit is used to control the power of a laser beam. The power compensation apparatus comprises a servo error signal extraction circuit that has a threshold voltage. The servo error signal extraction circuit is used to receive a servo error signal and to extract an absolute value of a portion of the servo error signal over the threshold value. The gain setting unit is used to receive the absolute value of the portion of the servo error signal over the threshold value and to generate a compensation signal using a gain value to adjust the absolute value. The compensation signal is then added to the power of the laser beam.

The present invention further provides an optical device for recording/reproducing data in a record carrier. The optical device includes a power compensation apparatus for controlling the power of the light beam. The power compensation apparatus is used to receive a servo error signal and extract a partial of a servo error signal over a threshold voltage. Using a gain value to adjust the absolute value, a compensation signal is generated and added to the power of the light beam.

BRIEF DESCRIPTION OF DRAWINGS

These, as well as other features of the present invention, will become more apparent upon reference to the drawings wherein.

DETAILED DESCRIPTION

Figure 1:
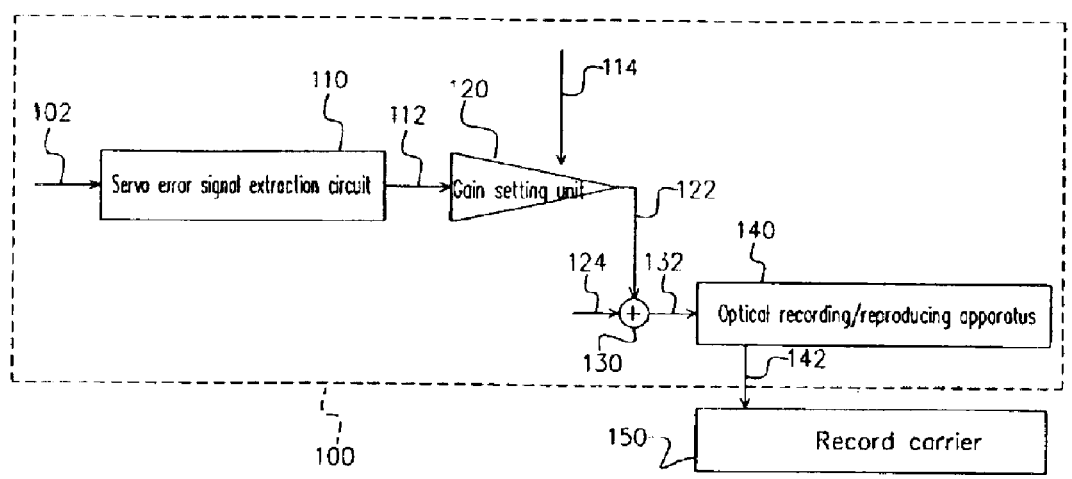
FIG. 1 shows an optical device comprising a power compensation apparatus according to the present invention.

The present invention is described in the following embodiment and illustrated in the accompanied drawing. In the accompanied drawing, the same or similar devices are denoted by the same reference numeral or symbol.

The present invention provides a power compensation apparatus to compensate a write signal. The power compensation apparatus comprises a signal extraction circuit having a threshold voltage and a gain setting unit. The signal extraction circuit is operative to extract an absolute value of a portion of an error signal over the threshold voltage. The gain setting unit then sets a gain value according to the absolute value and to add the absolute value into the write power for compensation. The error signal is the error generated during operation of the system.

The present invention can be applied to an optical device which uses a light beam such as a laser beam to record/reproduce data in an optical record carrier such as a compact disc. The light beam is used to write data into or read data from the compact disc to record/reproduce data.

The optical device includes a power compensation apparatus to compensate power of the laser beam. The power compensation apparatus comprises a servo error signal extraction circuit and a gain setting unit. The servo error signal extraction circuit is used to receive a servo error signal and extract an absolute value of a portion of the servo error signal over the threshold voltage. The servo error signal includes an error signal generated by a servo system, for example, a servo error signal output from a radio frequency amplifier. In this embodiment, a focus error signal is used as an example. The gain setting unit receives the absolute value to set a gain value to compensate the power of the laser beam. Thereby, the variation of power caused by the servo error signal is compensated. An adder can be used to add the gain value to the laser beam, so as to compensate the write power.

FIG. 1 shows a circuit diagram of the optical device 100 including a power compensation apparatus. The power compensation apparatus comprises a servo error signal extraction circuit 110 and a gain setting unit 120. The servo signal extraction circuit 110 has a threshold voltage and is used to receive a servo error signal 102, and to extract an absolute value of a portion of the servo error signal 102 over the threshold voltage. That is, the absolute value of the portion of the servo error signal 102 over the threshold voltage of the servo signal extraction circuit 110 is extracted for following computation. The servo error signal includes the servo error signal generated from a radio frequency amplifier, for example. The gain setting unit 120 receives the absolute value of the servo error signal 102 over the threshold voltage and sets a gain value 114 according to the absolute value 112 and pick-up head characteristic. The value 122 is used to compensate the power laser light beam 124. The compensation can be implemented using an adder 130 to add the gain value 122 into the laser beam 124 to obtain the compensation for the light beam 132 applied to the optical recording/reproducing apparatus 140. The write or read operation of the optical recording/reproducing apparatus 140 can thus be performed on the record carrier 150 such as a rewritable compact disc.

In one embodiment of the present invention, in addition to setting the gain value according to the partial value of the servo error signal over the threshold voltage, the gain setting unit 120 can further adjust the gain value according to the characteristic laser power of the optical pick-up head.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A power compensation apparatus to compensate a write power, comprising: a servo error signal extraction circuit, having a threshold voltage, the servo error signal extraction circuit being operative to receive a servo error signal and extract an absolute value of a portion of the servo error signal over the threshold voltage; a gain setting unit, operative to receive the absolute value of the portion of the servo error signal over the threshold voltage, and using a gain value to adjust the absolute value of the portion of the servo error signal over the threshold voltage to generate a compensation signal; and an adder, to add the compensation signal into the write power.

2. The power compensation apparatus according to claim 1, wherein the servo error signal includes a focus error signal.

3. The power compensation apparatus according to claim 1, wherein the servo error signal includes a pickup head error signal.

4. The power compensation apparatus according to claim 1, wherein the write power includes a write power applied to a recording/reproducing apparatus.

5. A power compensation method to compensate a write power, comprising: receiving a servo error signal and extract an absolute value of a portion of the servo error signal over a threshold voltage; receiving the absolute value of the portion of the servo error signal over the threshold voltage and using a gain value to adjust the absolute value of the portion of the servo error signal over the threshold voltage to generate a compensation signal; and adding the compensation signal into the write power.

6. The power compensation method according to claim 5, wherein the servo error signal includes a focus error signal.

7. The power compensation method according to claim 5, wherein the servo error signal includes a pickup head error signal.

8. The power compensation method according to claim 5, wherein the write power includes a power for writing an optical recording/reproducing apparatus.

9. An optical device, suitable for using a laser beam to record/reproduce data in a record carrier, the optical device comprising a power compensation apparatus to control a power of the laser beam, which further comprises: a servo error signal extraction circuit, having a threshold voltage, the servo error signal extraction circuit being operative to receive a servo error signal and extract an absolute value of a portion of the servo error signal over the threshold voltage; a gain setting unit, operative to receive the absolute value of the portion of the servo error signal over the threshold voltage, and using a gain value to adjust the absolute value of the portion of the servo error signal over the threshold voltage to generate a compensation signal; and an adder, to add the compensation signal into the write power.

10. The optical device according to claim 9, wherein the servo error signal includes a focus error signal.

11. The optical device according to claim 9, wherein the record carrier includes an optical disc.

* * * * *